Patented Oct. 10, 1950

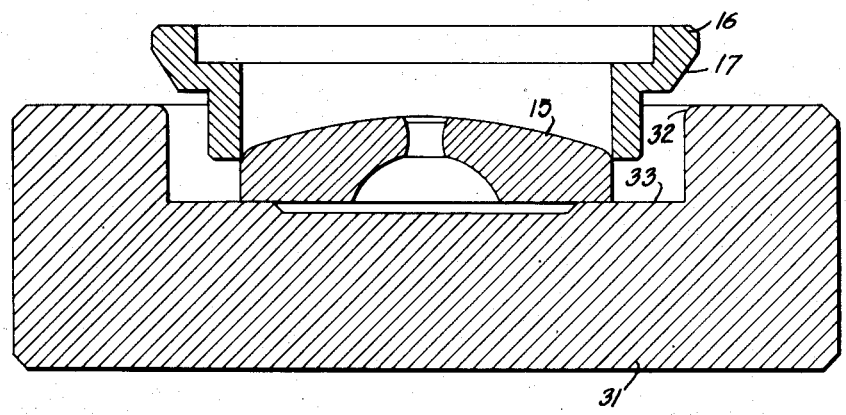
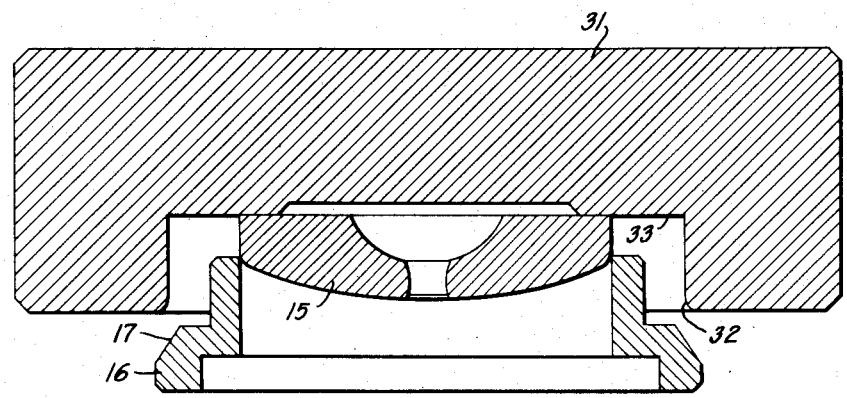

2,525,525

UNITED STATES PATENT OFFICE 2,525,525

SHOCK-ABSORBING BEARING

Henri Colomb, Lausanne, Switzerland

Application May 7, 1945, Serial No. 592,308
In Switzerland July 28, 1944

1 Claim. (Cl. 58—140)

The shock-absorbing jewel-bearings for clock and watch movements consist essentially of a detachable bearing body in which the pierced jewel is fixed; the body is centered in its mounting by means of annular conical surfaces of like conicity, or, of two pairs of ring-shaped centering elements the surfaces of which may be conical, or of conical surfaces each in contact with an edge, preferably rounded or beveled.

In the case of one pair of narrow conical surfaces, or of a single conical surface in contact with a rounded or beveled edge being adopted, to bring about the centering of the setting in its mounting, a second pair of surfaces transversely perpendicular to the axis of the bearing will be necessary in order to obtain the required centering effect.

Should the latter system be adopted, it is of great importance that the first pair of surfaces come into contact at the same moment as the other pair of surfaces one at least of which is conical. The dimensions of the mechanical parts in question, as well as the difficulty or even the impossibility of determining the working conditions of the shock-absorbing device have always been the cause of wrong evaluation of the real efficiency of such contrivances. As a rule, it is only on noticing after a shock that the movement is keeping bad time, that one can infer irregular functioning of the device.

For two special reasons, the exactness in dimension and shape of the parts of the centering device is of utmost importance: Small defects may cause the bearing body to incline, thus bringing the arbor too close to the wall of the hole in the mounting. In the movements for bracelet-watches, the space between the axle and the wall of the axle hole in the mounting should not exceed 3/100 mm. Thus the importance of the setting being co-axial with respect to the hole in the mounting is obvious. Again, when the extremity of the pivot is resting against the cap-jewel, the distances between the mounting and the safety-roller, on the one hand, between the mounting and the extremity of the balance spring collet, on the other hand, should be exact in order to obtain good functioning of the device in question and of the escapement. It is clear that the setting must find its way back into its correct position, if these distances are to be strictly observed, and this depends on the precision in the dimensions and position of the parts.

The aim of the present invention is to eliminate once and for all the causes of defective functioning of jewel-bearing shock-absorbers by an adequate and simple procedure in the making: i. e. a procedure of making by which simultaneous cooperation of the surfaces of the setting with the corresponding surfaces of the mounting may be ensured.

This is obtained by adjusting the relative position of the pierced jewel with respect to one of the centering-surfaces of the setting, beforehand. In the present proceeding of manufacture, this end is achieved by the use of a jewel-setting-gauge-press the shape and dimensions of which correspond exactly to those of the mounting.

If the metal setting is of such depth that, when in place, the stone is salient, the face of the latter will be in contact with the bottom of the gauge, thus forming with respect to the conical surface an essential transverse centering surface which will cooperate with the base of the mounting in the actual device.

The drawing represents, for an example, two possible designs of a shock-absorbing jewel-bearing in which the bearing body has been made according to the present disclosure.

Fig. 3 illustrates an intermediate stage in a first manner of carrying out the method, and Fig. 4 shows an intermediate stage in a second manner in which the method is carried out.

Figure 1:
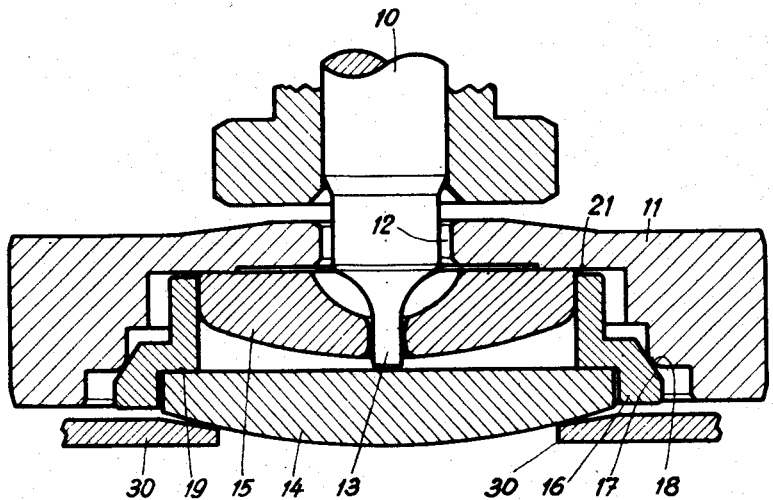
Fig. 1 shows a diametrical cross-section of a shock-absorbing jewel-bearing furnished with a bearing body made according to the invention.

In Fig. 1 the balance-wheel arbor is designated by 10; the mounting by 11, the hole in the mounting by 12, through which the staff and pivot 13 pass, the latter resting against the jewel-cap 14 and turning in the pierced jewel 15. These parts are all kept in place by means of a spring 30, as is generally the rule. Care must be taken to properly protect the pivot 13 and the stone 15.

The jewel-setting 16 is made of metal of high modulus and limits of elasticity, as for instance tempered steel or beryllium alloy: its conical surface 17 cooperates in the known manner with the rounded edge 18 of the mounting 11.

The cap jewel 14 rests on the bottom 19 of the recess destined for it; the pierced stone is driven into its setting 16. The setting of the jewel is done by means of a special gauged press the shape and dimensions of which are identical to those of the mounting; special attention being drawn to the exactness of the distance between the corresponding transverse centering surface 21 and edge 18.

There are two possible ways of setting the jewel with help of the gauged press. The first (Fig. 3) is to place the pierced stone 15 on the bottom 33 of the gauge 31 and to drive the setting 16 onto the former until its centering surface 17 comes into close contact with the corresponding centering edge 32 of the gauge 31. The second (Fig. 4) is to drive the stone 15 into the setting by means of the bottom 33 of the gauge 31 until the mentioned centering surface 17 and edge 32 touch closely. This operation can be quickly done with high precision; the bearing bodies assembled in this manner are rigorously identical one with the others.

The height of the setting is of paramount importance. It should be chosen so that the stone projects and cooperates freely with the transverse centering surface of the inside base of the mounting into which the stone and setting fit. In this way the projecting surface of the jewel together with the said transverse centering surface of the mounting cooperate efficiently with the second pair of surfaces, one at least of which is conical, thus effecting, with help of the spring 30, the recentering of the bearing and arbor, displaced due to some shock undergone by the watch.

Figure 2:
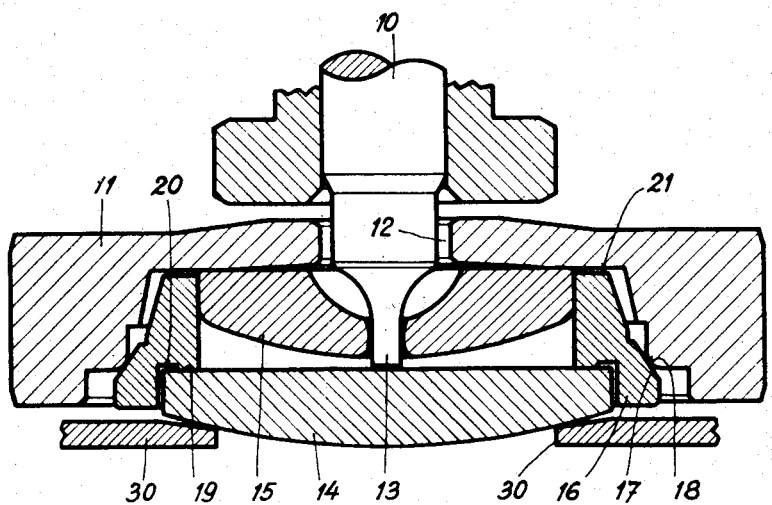
Fig. 2 shows a similar section in which the dimensions of the metal setting of the bearing body are different.

In spite of the inevitable tolerance which must be allowed for in the process of manufacture, this procedure is exceedingly efficacious; for the exactness and regularity of the centering device is ensured by the nature of its construction. Any small differences in the height of the stone or setting—in the latter with respect to the conical surface—can be compensated by right adjustment of the two surfaces of the stone and setting, respectively, on which the correct functioning of the device depends. If we consider the design represented in Fig. 2, we notice that the mechanical parts are the same and designated by the same reference figures. The difference lies in the shape and dimensions of the setting 16 (compare cross-sections in Figs. 1 and 2) and in the metal used. The first make is in tempered steel, the one now in question in brass or nickel alloy. The procedure of setting and gauging is the same as for the former.

In both designs, the conical surface is produced on the setting. This is however not essential: the conical surface could be run into the mounting and the rounded edge turned on the setting. In this case, the rounded edge would be taken as the point with respect to which the transverse centering surface of the jewel could be measured and gauged.

It is equally important that the diameter of the rounded annular edge of the mounting as well as its position relative to the base 21 of the stepped recess, should be very exact. Should it be necessary to true the shape and position of this edge, a specially shaped press-punch can be used to obtain very high precision, having a cylindrical body of diameter corresponding to the maximum diameter of the recess of which it constitutes the edge, then a short tapered centering shaft followed by a part ending in a transverse plane centering surface which, at the end of the operation, will lie flat against the base 21. The tapered part of the setting, especially if it is made of tempered steel or beryllium alloy, is exposed to deformation during the driving operation in the setting of the pierced jewel, i. e. a slight modification of the cone and diameter may be incurred. On assembly of this device, the centering surfaces of the bearing-body will nevertheless be in their correct relative position; the only change will be one of elevation which effects the place of the jewel-cap alone. An increase of 7/1000 mm. in the diameter will produce a change in position of the jewel-cap of 5/1000 mm. in the plane of elevation.

In practise, tempered steel settings rarely exceed a maximum tolerance in the diameter of the centering cone, after truing, of about 5/1000 mm., which corresponds to a change in the plane of elevation of the surface 19 of less than 3/1000 mm. This small change is evidently negligible. Should this tolerance be exceeded for one reason or another, for example, as in the case of brass-settings, a small ring-shaped groove 20 can be included in the construction in the base of the recess carrying the jewel-cap. In this way, the necessary truing of the surface 19 can be easily effected with a milling-cutter or lathe, cutting with respect to the base-surface of the stone or to the cone of the setting.

The distance between the two stones in the setting is of importance to assure correct oiling conditions. In order to keep within the specific tolerance, the stones should be ground to the proper thickness in an automatic machine. Two thicknesses must be obtained, one for the tempered steel settings, the other for those in brass. It is self-evident that if, on the one hand, the centering surfaces of the bearing bodies are uniformly and respectively in their correct relative positions one with respect to the other, i. e. the conical surface and the transverse exterior centering surface of the jewel; that if, on the other hand, the corresponding surfaces of the mounting, which can be rectified if need be, as indicated above, whereby the transverse base surface is taken as basis, are equally correct in all the pieces, the described procedure will give the maximum precision and consequently the maximum security practically possible in regard to the specific function of the device. For a dimension in elevation given of the bearing the thickness of the jewel mounting can either be increased by the distance between its setting and the mounting or the height of the bearing be diminished by this amount. This is an advantage of the device.

It need hardly be added, that the procedure of manufacture in question has its application outside of the systems of bearings described and represented in the drawings. All systems in which the centering depends on the correct relative position of surfaces, come into consideration. One of the considerable advantages of the present invention is the fact that of making the centering-operation depend on two sets of independent surfaces, instead of one set, they can be adjusted on assembly, whereby small defects in the making are compensated for.

What I claim is:

In a shock-absorbing bearing, a mounting with a transverse centering surface, a setting, said mounting and said setting comprising together two circular centering surfaces in contact with each other, one at least of said circular centering surfaces being conical, and a pierced jewel with a transverse centering surface, set in and projecting beyond said setting to make contact by its transverse centering surface with the transverse centering surface of said mounting.

HENRI COLOMB.

REFERENCES CITED

The following references are of record in the file of this patent:

UNITED STATES PATENTS

| Number | Name | Date |
|---|---|---|
| 1,104,700 | Ohlson | July 21, 1914 |
| 1,642,102 | Colomb | Sept. 13, 1927 |
| 2,184,580 | Colomb | Dec. 26, 1939 |
| 2,219,067 | Colomb | Oct. 22, 1940 |